Jan. 31, 1956
M. F. MORRIS
2,732,660
PLANT TRELLIS
Filed April 9, 1954
2 Sheets-Sheet 1
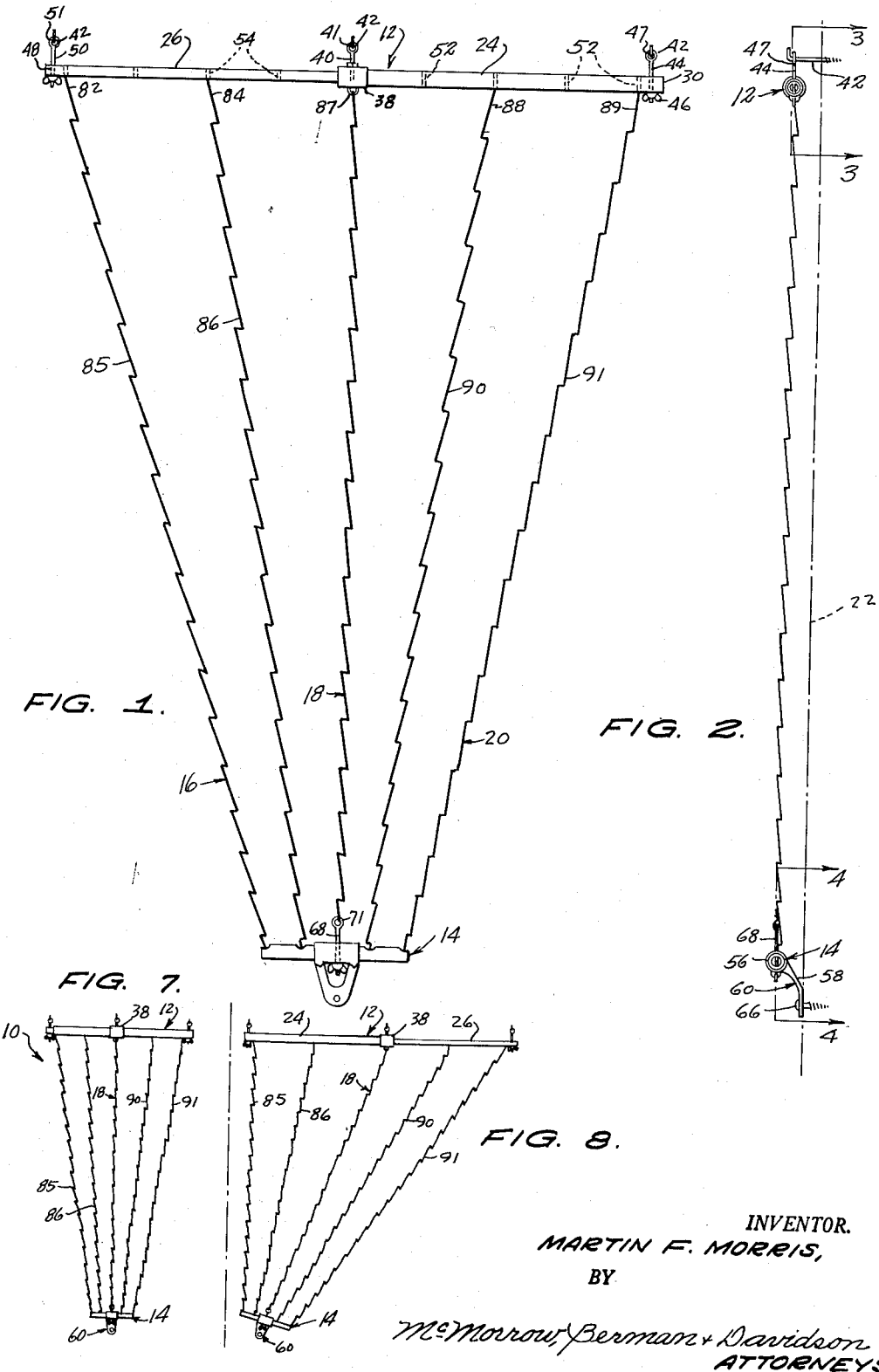
INVENTOR.
MARTIN F. MORRIS,
BY
McMorrow, Berman & Davidson
ATTORNEYS.

Jan. 31, 1956   M. F. MORRIS   2,732,660
PLANT TRELLIS
Filed April 9, 1954   2 Sheets-Sheet 2
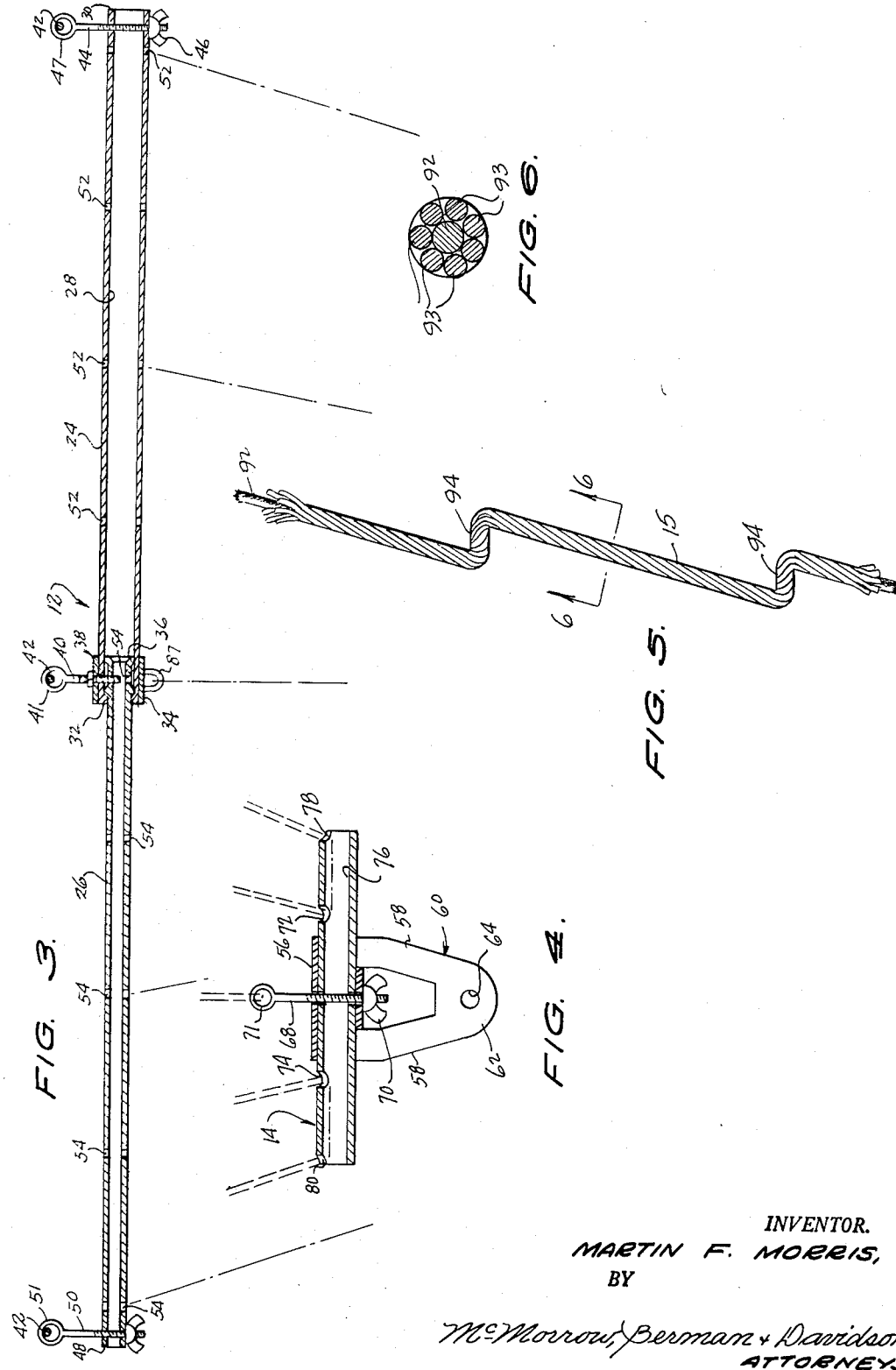
INVENTOR.
MARTIN F. MORRIS,
BY
McMorrow, Berman & Davidson
ATTORNEYS.

United States Patent Office 2,732,660
Patented Jan. 31, 1956

2,732,660

PLANT TRELLIS

Martin F. Morris, Banning, Calif.

Application April 9, 1954, Serial No. 422,209

1 Claim. (Cl. 47—47)

This invention relates to supports for the growing limbs or branches of plants and more particularly to a plant trellis.

It is an object of this invention to provide a plant trellis which is adjustable as to height, width and shape; which is preferably of all metal construction of rust-resistant materials; which is quick and easy to install requiring no special tools; and which the maintenance cost is low due to the fire and termite proof material employed in its fabrication; and which is always clean since there is little space for leaves or trash to hang upon.

It is a further object of this invention to provide a plant trellis which may be unhooked to permit refinishing of the surface upon which it is supported, such as the outside wall of a house or building, and then reattached thereto with no ill effects to the vine or plant growing upon the trellis.

Other objects and advantages will become apparent from the following detailed description, forming the specification, and taken in conjunction with the accompanying drawing, wherein:

Figure 1 is a front elevational view of a plant trellis embodying this invention;

Figure 2 is a side elevational view of the plant trellis as attached to a supporting surface;

Figure 3 is a cross sectional view taken on line 3—3 of Figure 2;

Figure 4 is a cross sectional view taken on line 4—4 of Figure 2;

Figure 5 is a front elevational view of a portion of a wire extending between the support bars of the trellis;

Figure 6 is a transverse sectional view taken on line 6—6 of Figure 5;

Figure 7 is a front elevational view, somewhat diagrammatic and on a reduced scale, of one arrangement possible with the present trellis; and Figure 8 is a front elevational view, similar to Figure 7, but showing the trellis adjusted to a different width and shape.

With continued reference to the drawings, the plant trellis of this invention is generally indicated at 10 and generally comprises a normally upper, horizontally disposed supporting cross bar 12, a normally lower supporting cross bar 14 of considerably lesser length than the bar 12, and a plurality of kinked wires 16, 18 and 20 which extend between the spaced bars 12 and 14 to define support arms for the branches or vines of a plant.

There are means associated with both the upper and lower bars 12 and 14 respectively for attaching the trellis to a supporting surface, such as the exterior of a wall 22 of a home or other building structure.

The upper support bar 12 includes a pair of hollow tubular sections 24 and 26, with the section 26 being telescopically received within the bore 28 of the section 24 by entering the end 30 thereof and extending to a selected length from the opposite end 32 of the section 24. It will be noted that there is a lip 34 formed annularly about the end 32 of the section 24 to engage with a flared end 36 on the section 26 so that the tubular section 26 cannot be pulled entirely out of the section 24, since this lip 34 and flared end 36 define a stop means.

A bracket 38 is carried by the elongated tubular section 24 adjacent its end 32 and the bracket is provided with an eye bolt 40 threadingly received in suitable threaded registering openings through the top portion of the bracket 38 and the bar section 24 so that the eye 41 extends upwardly from the bracket and bar section and is adapted to receive therein one end of a hook 42, the other end of the hook being threadingly engaged in the support surface or wall 22.

An eye bolt 44 has its threaded shank extending through suitably threaded aligned openings transversely through the elongated tube section 24 adjacent the end 30 thereof, and is secured thereto as by a wing nut 46 received on the end of the shank extending to the opposite side of the section 24 so that the eye 47 of the bolt 44 will extend upwardly from the section 24 and in spaced parallel relation with the eye bolt 40. The eye 47 is adapted to receive therein one end of a hook, similar to the hook 42, the other end of which is threadingly engaged in the supporting surface so that the bar section 24 may be supported upon the support surface and in spaced relation thereto and capable of selective removal from the hooks upon which it is dependingly supported.

The elongated tubular bar section 26 carries at its end 48 an eye bolt 50, similar to the eye bolt 44, which extends transversely therethrough and secured thereon by a suitable wing nut so that the eye 51 is disposed above the bar section 26 and in spaced parallel relation with the bolts 40 and 44. The eye 51 is adapted to receive the hooked end of a hook similar to the hook 42 therein while the other end of the hook is secured in the supporting surface 22 and extends laterally therefrom so that the bar assembly 12 will be dependingly supported from the support surface or wall 22 and capable of selective detachment therefrom.

The tubular bar section 24 is provided with a plurality of openings 52 transversely therethrough and spaced longitudinally thereof between the bracket 38 and the bolt 44 while the tubular bar section 26 is similarly provided with a plurality of longitudinally spaced, transverse openings 54 therethrough between the flared end 36 and the bolt 50 carried adjacent the end 48 thereof.

The lower bar 14 is of hollow tubular construction and is slidably received within the hollow tubular socket 56 carried at one end of a pair of slightly divergent arms 58 of a bracket, generally indicated at 60. As will be clearly seen in Figure 2, the bight portion 62 is provided with an aperture 64 therethrough so that the base or bight portion 62 will overlie the support surface 22 and a screw 66 will secure the bracket 60 thereon by passing through the aperture 64 and into the support surface 22 so that the bars 12 and 14 are maintained in a spaced relation.

An eye bolt 68 has its threaded shank extending transversely through suitably aligned openings in the socket 56 and the mid-point of the lower bar 14 with a wing nut 70 securing the bolt with the eye 71 disposed above the bracket 56, or to the end thereof remote from the bight or base 62. It will be noted, as shown in Figure 2, that the arms 58 extend outwardly and upwardly from the base or bight 62 in relation to the support surface upon which the bracket 60 is mounted. Thus, the lower bar 14 is in spaced relation to the support surface or wall 22.

The lower bar 14 is provided with a pair of spaced openings 72 and 74 through the upper portion of the tubular bar and in communication with the bore 76 extending longitudinally through the bar 14, the openings 72 and 74 being spaced from each other and disposed to either side of the socket 56. Notches 78 and 80 are provided at the respective opposite ends of the lower tubular bar 14 in the upper surface thereof, that is the portion thereof remote from the legs 58 and bight or base 62 of the bracket 60, and in longitudinal alignment with the openings 72 and 74. The wire 16, which is kinked along its length to substantially stiffen the wires and thus make possible the use of the smaller sized wire than would otherwise be practical, has its free ends 82 and 84 secured in selected ones of the openings 54 in the upper bar section 26 with the bight portion thereof being threaded through the opening 74 and the notch 80 of the lower bar 14 so that the arms 85 and 86 extend between the upper and lower bars.

One end of the kinked wire 18 is secured in the eye 71 of the bolt 68 and has its upper end, or the end remote from the eye 71, secured in a depending loop 87 formed on the sleeve-like bracket 38, so that the wire 18 extends between the upper and lower bars. The wire 20 is secured at its free ends 88 and 89 in selected ones of the openings 52 through the upper bar section 24 while its bight portion extends through the opening 72 and through the notch 78 in the lower bar 14 so that the arms 90 and 91 thereof extend between the upper and lower bars. The wire 20 is kinked along its length in the same manner as the wires 16 and 18.

The wire used for the trellis 10 is a seven strand wire, the strands being twisted about a fibrous center core 92 while the offsets 94 are provided in the wire, such as the wire 15 shown in Figure 5, which is wire of the type used for the wires 16, 18 and 20 of the trellis 10, at equal intervals for the length of the wire which will assist in holding the plants or vines in proper place with a minimum of plant ties being required. Thus, the kinks or offsets 94 serve as anchors about which the stems of the growing plant or vine may entwine without requiring plant ties to maintain the stems in proper place on the trellis. The strands 93 of the wire 15 may be made from a copper-bearing alloy which has a radiation quotient which is sufficiently rapid to keep the temperature of the wire low when exposed to direct sunlight so as to avoid burning the plant, and along with the fibrous core 92 will practically eliminate burning of the plants secured on the trellis as would be the case with a solid wire.

The elements of the trellis 10, aside from the wires 16, 18 and 20, are preferably made from a suitable rust-resistant and non-corrosive metal so as to withstand the effects of weather and thus require a minimum of maintenance.

In use, the upper bar 12 is fixed at a desired length by telescopically moving the section 26 into or out of the bore 28 of the upper bar section 24, and when the desired length of the upper bar is achieved, the bolt 40 may then be threaded through the bracket 38 so as to be in register and enter through one of the openings 54 in the section 26 to thereby secure the selected adjusted length. The wires 16, 18 and 20 may then be secured between the upper and lower bars in the manner hereinbefore described so as to extend therebetween, the space between the upper and lower bars being entirely dependent upon the selected length of the wires so that a trellis of varying selected lengths may be readily and easily achieved either at the initial setting of the trellis or at a later date. With the lower bar 14 secured in the socket 56 of the bracket 60 and the wires extending to the desired length between the upper and lower bars, the bracket 60 will be dependingly carried by the upper bar 12. The upper bar may then be supported upon the desired support surface, such as the wall 22, by having the eyes of the respective bolts 40, 44 and 50 receiving one end of the hooks 42. The bracket 60 may then be secured to the wall or supporting surface and may be disposed parallel to or in angular relation to the upper bar 12 so that the lower bar will assume a corresponding position relative thereto. In Figure 7, there is shown an arrangement where the upper and lower bars are in spaced parallel relation, and with the upper bar 12 of relatively short length, while in Figure 8 there is illustrated an arrangement wherein the lower bar 14 is disposed in angular relation to the upper bar 12 which is fully extended.

Also, it should be noted that the eye bolts 44 and 50 may be inserted through other corresponding ones of the openings 52 and 54 respectively so that these outside bolts may be moved inwardly to allow connection of the top bar 12 to hooks 42 spaced at shorter distances between their centers without changing the appearance of the trellis wires and bars. This is of importance where a limited supporting surface area is available upon which the upper bar can be secured.

From the foregoing, it will be apparent that the trellis 10 is capable of selective adjustment as to length, width and the particular shape which it is desired to have the trellis assume. Thus, an infinite variety of shapes is possible with the trellis 10 at the option and ingenuity of the user and will exhibit a decorative effect upon the wall of the building structure to which the trellis is attached. Also, it will be appreciated that the upper bar 12 may be removed from its supporting hooks when it is necessary or desirable to refinish, or to do other work, upon the supporting surface of wall 22 behind the trellis 10.

It will also be apparent that the trellis 10 may conveniently be offered to a prospective purchaser in a knock-down arrangement so as to facilitate attractive boxing thereof as well as affording a minimum of storage and shipping space in the merchandising thereof.

While there are shown and described the preferred embodiment of the invention, it is to be understood that the structure is susceptible to change and modification within the practicability of the invention and therefore should be limited only by the scope of the claim appended hereto.

What is claimed is:

A plant trellis comprising a first bar having selectively adjustable telescoping sections, each of said sections having a plurality of longitudinally spaced transverse openings therethrough, a bracket carried by said bar intermediate its ends for detachable engagement on a supporting surface, means carried by each of said sections at the ends thereof remote from said bracket for detachable engagement with the supporting surface, and a second bar in spaced relation to said first bar and having a plurality of spaced openings therein, and wires extending between said bars having an intermediate portion thereof threaded through adjacent ones of said spaced openings in the second bar and secured at their free ends in selected ones of the openings in said sections of the first bar with said wires arranged in divergent relation from said second bar to said first bar and the degree of divergence being proportional to the adjustment of said sections of said first bar, each of said wires having kinks arranged in spaced relation therealong and serving as anchors about which the plant stems may entwine.

References Cited in the file of this patent

UNITED STATES PATENTS

| | | |
|---|---|---|
| 377,444 | Watrous | Feb. 7, 1888 |
| 510,524 | Smith | Dec. 12, 1893 |
| 878,494 | Basse | Feb. 11, 1908 |
| 881,594 | Knox | Mar. 10, 1908 |
| 918,579 | Murch | Apr. 20, 1909 |
| 1,529,705 | McKnight | Mar. 17, 1925 |
| 2,083,678 | Wilson | June 15, 1937 |
| 2,659,493 | Ralston | Nov. 17, 1953 |

FOREIGN PATENTS

| | | |
|---|---|---|
| 815,574 | Germany | Oct. 4, 1951 |